US010439817B1

(12) United States Patent
Choi et al.

(10) Patent No.: US 10,439,817 B1
(45) Date of Patent: Oct. 8, 2019

(54) IDENTIFY MANAGEMENT USING EPHEMERAL BIOMETRICS

(71) Applicant: National Technology & Engineering Solutions of Sandia, LLC, Albuquerque, NM (US)

(72) Inventors: Sung Nam Choi, Sandia Park, NM (US); Susan L. Washburn, Albuquerque, NM (US); David John Zage, Fremont, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 14/051,318

(22) Filed: Oct. 10, 2013

Related U.S. Application Data

(60) Provisional application No. 61/712,569, filed on Oct. 11, 2012.

(51) Int. Cl.
*H04L 9/32* (2006.01)

(52) U.S. Cl.
CPC .................. *H04L 9/3231* (2013.01)

(58) Field of Classification Search
CPC ......... H04L 9/32–3297; H04L 63/0861; G06F 21/30–46
USPC ................ 713/168–174, 182–186, 202, 161; 709/225, 229; 726/2–9, 18, 22
See application file for complete search history.

(56) References Cited

U.S. PATENT DOCUMENTS

| | | | |
|---|---|---|---|
| 2004/0148526 A1* | 7/2004 | Sands | G06F 21/32 726/5 |
| 2006/0149971 A1* | 7/2006 | Kozlay | 713/186 |
| 2007/0186106 A1* | 8/2007 | Ting et al. | 713/168 |
| 2011/0197067 A1* | 8/2011 | Corndorf | H04L 9/0844 713/172 |
| 2013/0133055 A1* | 5/2013 | Ali | H04L 63/0861 726/7 |

* cited by examiner

*Primary Examiner* — Kevin Bechtel
*Assistant Examiner* — Quazi Farooqui
(74) *Attorney, Agent, or Firm* — Daniel J. Jenkins

(57) ABSTRACT

An authentication system, device and method that include ephemeral biometrics at login authentication is disclosed. The system, device and method may continue to authenticate the user while accessed to a user system. The system, device and method may also include position/location reporting of the device.

9 Claims, 1 Drawing Sheet

IDENTIFY MANAGEMENT USING EPHEMERAL BIOMETRICS

CROSS-REFERENCE TO RELATED PATENT APPLICATIONS

This patent application claims priority from and the benefit of U.S. Provisional Patent Application Ser. No. 61/712,569, filed Oct. 11, 2012, entitled "Auto-Registration of Indoor Positioning Beacons", which is hereby incorporated by reference.

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

FIELD OF THE INVENTION

The application generally relates to identity management using ephemeral biometrics. The application relates more specifically to a system and method for initial identity validation and persistent identity validation for accessing critical systems.

BACKGROUND

For critical infrastructure facilities, mitigation techniques for insider threats are primarily non-technical in nature and rely heavily on policies/procedures. Traditional access control measures (access cards, biometrics, PIN numbers, etc.) are built on a philosophy of trust that enables those with appropriate permissions to access facilities without additional monitoring or restrictions.

Many authentication systems, such as those used in online banking and other web applications, operate on the basis of a virtual ID (e.g., session cookie), that is created after an initial authentication, typically via user name and a password. The security application essentially transforms a computing device into both a device that is associated with the user, and a location of the user. The session cookie itself becomes the item that is tied to the network source address of the computer, which becomes akin to a location. As GPS devices and smart phones continue to become smaller, less expensive and more powerful, the session cookies may also serve a dual purpose to identify the user location. Additionally, after initial access is granted, the authentication system may prompt the user to periodically re-enter access identification, particularly when changing applications, thereby disrupting the user.

Thus, there is a need for an authentication system with reduced disruption to the user that provides a high assurance of strong authentication.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

The present disclosure is directed to an Ephemeral Biometric (EB) device designed to: 1) register and couple an owner's identity (i.e., biometric imprint) to a wearable portable electronic device using one or more of the factors of three factor authentication: a) what you know, b) what you are, and c) what you have; 2) while constantly measuring vital signs (i.e., heart rate, blood pressure) to continuously maintain a link between the EB device and the individual. This two-step process provides persistent identity validation with high assurance of strong authentication while only requiring simple one-time user authentication interaction.

One embodiment relates to . . .

Another embodiment relates to . . .

An object of the present invention is to provide an authentication system with reduced disruption to the user that provides a high assurance of strong authentication.

Another object of the present invention is to provide an authentication system with high assurance of strong authentication while only requiring simple one-time user authentication interaction.

Another object of the present invention is to provide an authentication system to track and monitor users, thereby mitigating insider threats.

An advantage of the present invention is to provide for user authentication that does not disrupt the user An advantage of the present invention is biometric data is only registered on the biometric device, eliminating the need for a third-party to store and secure personally identifiable information.

An advantage of the present invention is the use of unique EB identifiers, which are both revocable and re-issuable, unlike traditional biometrics which are immutable.

An advantage of the present invention is location can be coupled with authentication, enabling new security protocols.

Alternative exemplary embodiments relate to other features and combinations of features as may be generally recited in the claims.

DETAILED DESCRIPTION OF THE EXEMPLARY EMBODIMENTS

The present disclosure is directed to an authentication system, device and method that includes ephemeral biometrics at login authentication. The present disclosure is also directed to an authentication system, device and method that includes ephemeral biometrics at login authentication and that continues to authenticate the user while accessed to a user system.

Ephemeral biometrics (EB) are distinctive identifiers derived from merged traits of human factors (fingerprint, password, etc.) and the persistent live state of the user. EB are used to strongly couple a human to an authentication device. According to an embodiment of the invention, an EB device is disclosed that generates a unique human-to-machine identifier while simultaneously monitoring the live state of the user. The EB device enables an identity as long as the human and hardware remain coupled. The unique human-to-machine identifier, connected with the user's live-state, maintains a link that validates identity and facilitates secure interactions with external devices. In an embodiment, the EB device may be integrated with a high-precision, real-time locating system (RTLS), so that the secure, active identity may be location monitored. In another embodiment, the ED device may be integrated with an indoor positioning system, such as disclosed in U.S. Patent Application entitled "INDOOR POSITIONING SYSTEM WITH AUTO-REGISTRATION", concurrently filed with this application by the inventors of this invention, the disclosure of which is incorporated in its entirety by reference. The EB device enables the transitional link between the computing device location to the user location and the computing device location.

Figure 1:
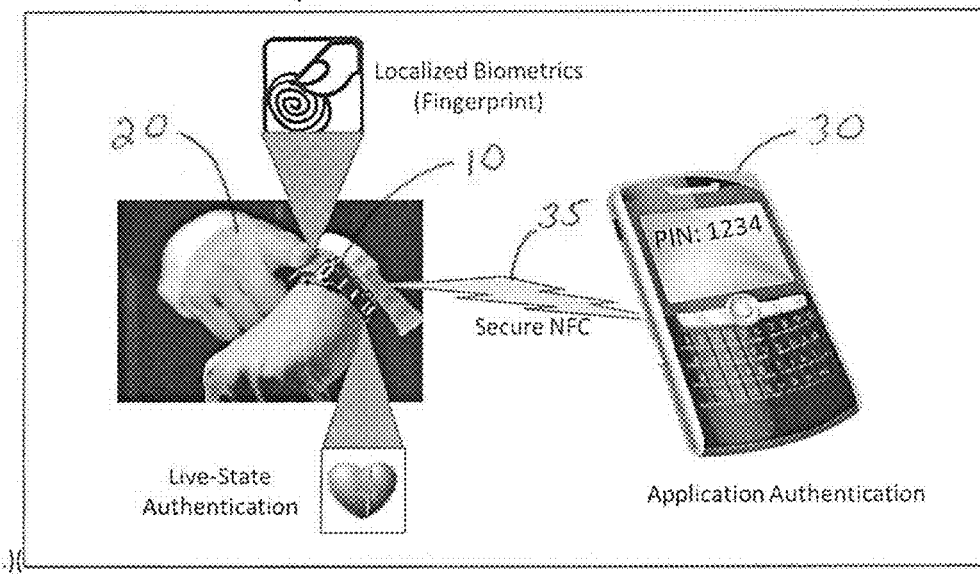
FIG. 1 illustrates an example of an EB device and an exemplary method of use according to an embodiment of the invention.

FIG. 1 illustrates an example of an EB device 10 according to an embodiment of the invention. The EB device 10 is in the form of a wrist watch that has been modified to include a first module to accept a local biometric login, in this example, a fingerprint, and a second module to monitor a live biometric parameter of a user 20, in his case, heart rate, and a third module to communicate an authentication to an electronic device 30. In another embodiment, the EB device may be a medallion, ring, necklace, anklet, or other device capable of monitoring a human condition, such as, but not limited to heart rate, body temperature, skin surface conductance, muscular potential, respiration rate, blood flow, or blood composition. In another embodiment, the local biometric login may be a fingerprint, retina scan, iris recognition, face recognition, palm print, hand geometry, blood vessel mapping, DNA, voice patterns/recognition, or hand writing.

Referring again to FIG. 1, the EB device 10 operates by accepting the local biometric login, validating that a user 20 is present by monitoring heart rate, and communicating with the electronic device 30, in this case a smart phone, into which a login identification, in this case a PIN, has been accepted. If all of these conditions are met and validated, the user 20 has access to the electronic device 30. In another embodiment, the electronic device 30 may be a computer, tablet, workstation, kiosk, network-enabled devices, or any device or system requiring limited access. The EB device 10 communicates with the electronic device 30 by a data link 35. The data link 35 may be NFC, Bluetooth, IrDA, ZigBee, WiFI, or any other wireless data transfer protocol.

In an embodiment, an EB device and identity verification procedure discussed above may be configured for use with preconfigured location boundaries as determined by a position/location system, for example, an indoor positioning system as described above. In an embodiment, authentication may be prohibited if, e.g., wireless devices are located outside a secured area or a classified room. Authentication bound by location context can provide additional security against remote cyber-hackers even in the case of compromised cyber-identity.

In an embodiment, an EB device may be a wearable medical sensor that can take accurate measurements while minimizing inconvenience and intrusiveness. An EB device may include some or all of these constraints that are typically levied on wearable medical sensor design:

- take live-state measurements on a continuous bases;
- measurements must be taken imperceptibly to wearer;
- wearable electronic device must be a small enough form factor that it does not hinder the wearers sense of fashion aesthetics;
- electronic device must have long lasting batteries; and
- must function accurately and reliably accommodating dynamics of motion/signal noise artifacts such as sweat, operating in the rain, etc.

In an embodiment, the EB may not take highly accurate or precise biometric measurements provided that the device is configured to keep continuous track of some vital sign measurement associated with the user. For example, the EB device does not have to detect how many heartbeats a person has per minute, but merely that the person is alive and that the EB device has not been tampered with. One exemplary EB device may be a wristwatch with fingerprint biometrics that will electronically lock in the wristband locked state when fingerprint biometrics is registered. As long as the wristband size is small enough to be used as handcuff, the EB functionality is satisfied. One risk of such a device is that if a malicious actor decides to steal the identity, he or she may sever the hand of the authorized user in order to use the locked-in state of the EB watch. To avoid this gruesome possibility, some physiological parameters representing vital signs are important to incorporate into the EB device.

Table 1 provides exemplary modalities and the pros and cons of using such measurements for EB development. As far as reasonably acceptable fashion for wearable EB, two factors seem to satisfy the fashion constraints: a wristband versus necklace format. Rings may also be used for EB device but may be less suitable as hands often are submerged in water, they are not an ideal format for carrying extra weight due to batteries and most importantly, it is difficult to measure physiological parameters in the finger. While people are used to wearing electronic devices on their wrist, necklaces have not typically been used beyond jewelry and it is hard to envision a world where people are comfortable wearing an electronic device around their neck. With these facts in mind, the wristband format is the clear winner due to fashion esthetics, portability (battery, size), and the availability of COTS fitness products.

TABLE 1

| Sensor Modalities | Description | Non-contact/ imperceptible | Continuous Measurement | Portable | Robust | Fashion Esthetics |
|---|---|---|---|---|---|---|
| Electromyograph (EMG) | Uses surface electrodes to detect muscle action potentials | No | Yes | Yes | No | N/A |
| Feedback thermometer | Detects skin temperature with a temperature-sensitive resistor that is usually attached to a finger or toe. | No | No | Yes | No | N/A |
| Eletrodermograph (EDG) | Measures skin electrical activity directly and indirectly using electrodes placed over the hand and wrist. | No | Yes | Yes | No | N/A |
| Electroencephalograph (EEG) | Measures the electrical activation of the brain from scalp sites located over the human cortex. | No | Yes | Yes | No | N/A |

TABLE 1-continued

| Sensor Modalities | Description | Non-contact/ imperceptible | Continuous Measurement | Portable | Robust | Fashion Esthetics |
|---|---|---|---|---|---|---|
| Photoplethysmograph (PPG) | Measures relative blood flow through a digit or the temple. An infrared light source is transmitted through or reflected off the tissue, detected by a phototransistor, and quantified inarbitrary units. | Yes | Yes | Yes | Yes | Yes |
| Electrocardiograph (ECG) | Electrodes are placed on the torso, wrists, or legs, to measure the electrical activity of the heart and measure the heart rate. | No | Yes | Yes | No | N/A |
| Pneumograph | A respiratory strain gauge uses a flexible sensor band that is placed around the chest and/or abdomen, measuring relative expansion/ contraction of the chest. | No | Yes | Yes | Yes | N/A |
| Capnometer | Measure end-tidal CO2 (the partial pressure of carbon dioxide in expired air at the end of expiration) exhaled through the nostril into a latex tube. | No | Yes | No | Yes | N/A |
| Rheoencephalograph (REG) | Electrodes are attached to the skin at certain points on the head and permit the device to continuously measure the electrical conductivity of the tissues of structures located between the electrodes. | No | Yes | Yes | No | N/A |
| Hemoencephalography (HEG) | A functional infrared imaging technique that measures the differences in the color of light reflected back through the scalp based on the relative amount of oxygenated and unoxygenated blood in the brain. | Yes | Yes | Yes | Yes | No |
| Magnetic field blood flow interaction | A non-invasive, magnetic sensor-based acquisition of blood pulse using the disturbance created by blood flowing through a localizedmagnetic field. | Yes | Yes | Yes | | N/A |

In an embodiment, an EB device may be linked to external applications, such as, but not limited to real time locating systems, access control points, and networks. These external applications may allow for the creation of novel access control techniques that eliminate previously identified deficiencies such as excessive end-user interaction. In another embodiment, the EB device may securely authenticate a user to multiple external machines or services, e.g., tablet, access point, Kerberos server, etc. The EB device may also facilitate the creation of unique authentication protocols to provide persistent identity verification.

The EB device provides highly secure coupling between human and machine as it is specifically designed to: 1) register and couple an owners identity to a wearable portable electronic device using one or more of the factors of three factor authentication; 2) while constantly measuring vital signs, i.e., heart rate, blood pressure, to maintain a link between the EB device and the individual. This two-step process provides persistent identity tracking and validation with high assurance of strong authentication, while it provides simple one-time user authentication interaction. The process by which an EB identity is established is the following:
1) The EB device (a wristband) will have a unique semiconductor/microchip identity
2) The EB device is registered with the biometric imprint from the owner
3) The biometrically registered individual authenticates to EB device (one-to-one match) and simultaneously the EB device will lock-in the live-state or the vital signs of the wearer
4) The identity coupling of the EB device with the wearer of the EB device is established. This EB of the human human-to-machine identity last for the duration the EB device is coupled with the user.

Using an EB device, authentication can be offloaded from a complex operating system to the simplified external EB device with a secure machine to machine coupling process. In cybersecurity, complexity is one of the biggest reasons for security vulnerabilities found in most computing systems. Standard operating systems (including those on smart phones) contain a minimum of ten million lines of codes. For every thousand lines, there are typically between five to fifteen errors which can lead to security vulnerabilities, presenting a daunting challenge to building secure operating systems. By offloading the authentication to an external EB device, security concerns arising from operating system complexity can be addressed. The coupling process of a biometrically linked, live-state checking EB device to an external machine(s) (i.e., computers, tablets, smart phones, access control mechanism) is described below:
1) The EB device will have a unique semiconductor/microchip identity
2) The EB device is registered with the biometric imprint from the owner
3) The external machine will have an EB agent application installed
4) The EB application will be activated with the initialization process using any form factor authentication.
5) The EB agent and device are coupled using a one-time user supplied input (e.g., via pin number), a nonce, and a common encryption key. The EB device functions as both the biometric verification/authentication agent and the electronic key fob for the external device.

6) The EB device generates another nonce, hashes it using a message digest function with the concatenation of the EB device identity and the user identity. The hashed data is then encrypted and sent to the external device.

Figure 2:
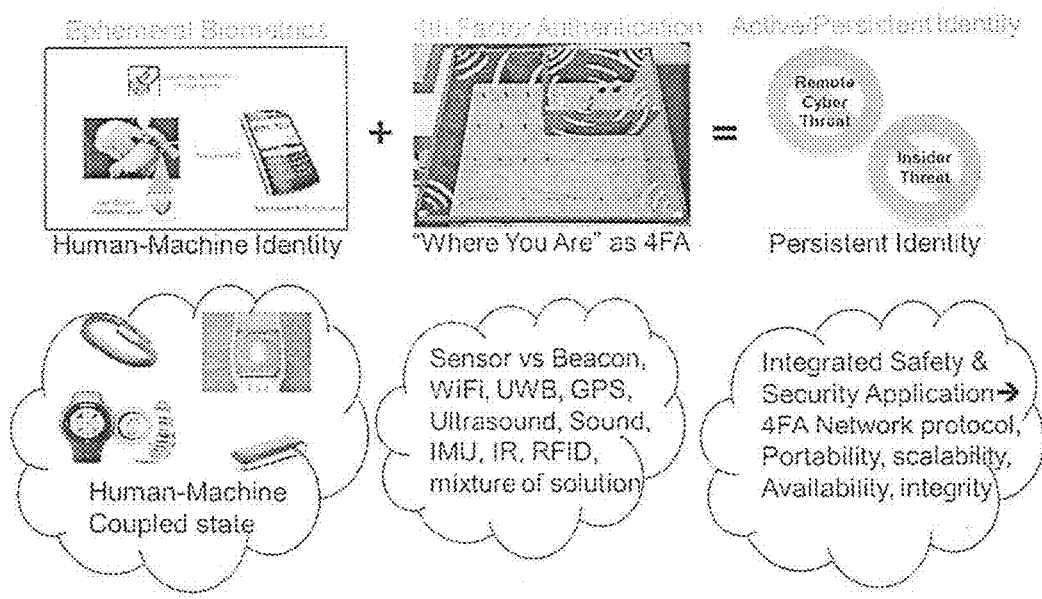
FIG. 2 illustrates an example scenario demonstrating how the use of EBs for authentication can address the shortcomings of traditional biometrics and provide strong authentication.

7) The external device decrypts the message from the EB device, verifies the nonce, the EB device, and the user identity (by comparing the hash), and executes critical transactions FIG. 2 is an example scenario demonstrating how the use of EBs for authentication can address the shortcomings of traditional biometrics and provide strong authentication. The owner of the EB uses a fingerprint to register his/her identity with the EB device. Using near field communication (NFC), the EB device will function as a key to securely activate the owners smart phone, without the need for explicit user interaction. Since the biometric data is only registered on the EB device, this eliminates the need for a third-party institution to store and secure personal information. If the EB device is stolen or lost, the owner can simply disable the EB coupling to the device, buy another EB device, and use a fingerprint (it could be previously used fingerprint) to register the new device. As can be seen from FIG. 2, the coupling of EB with the idea of a 4th factor authentication can lead to persistent authentication services. The 4th factor authentication being location or "where are you." By creating an active authentication service, it creates the possibility of tracking insiders and minimizes remote threats that now need to have a local presence. This type of authentication can be useful in a variety of domains including health and safety, finance, cyber/physical security, and material protection, control, and accounting.

Through the use of user location as a 4th factor of authentication and creating unique machine-to-human identity through EB, an active authentication solution is disclosed. The survey of physiological techniques that can be used to continuously validate the live-state and the potential commercial biofeedback products that can be modified for EB device is studied. By combining physical presence and persistent identity verification, the risk of remote cyber threat is addressed as well as possibilities of actively monitoring the insider behaviors.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the authentication system, device and method as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A method for authenticating a user's identity to determine access to a system, comprising:

inputting a first login into an ephemeral biometric device comprising a medical sensor;

persistently monitoring a live user biometric with the ephemeral biometric device and using the persistently monitored user biometric to persistently authorize the ephemeral biometric device without determining that the user biometric is unique to the user and that the user is unique;

communicating the authorization via a short distance wireless communication circuitry to an interface device;

inputting a second login to the interface device to access the system; and persistently communicating an authentication signal between the biometric device and the interface device by persistently generating a nonce at the ephemeral biometric device while persistently validating the nonce at the interface device to validate that data transmitted between the biometric device and the interface device is authentic, which then allows the interface device to persistently authenticate and access to the system.

2. The method of claim 1, wherein the first login comprises a fingerprint.

3. The method of claim 1, wherein the first login comprises a personal identification number.

4. The method of claim 1, wherein the interface device is selected from a group consisting of a smartphone, computer, tablet, workstation, kiosk, or any other network-enabled device.

5. An ephemeral biometric device for authenticating the identity of a user to determine access to a system, comprising:

a medical sensor comprising a biometric interface for accepting a biometric login from the user;

a monitoring device for persistently monitoring at least one live biometric parameter of the user and using the at least one persistently monitored user biometric to persistently authorize use of the ephemeral biometric device without determining the user biometric is unique to the user and that the user is unique; and a short distance wireless communication circuitry for persistently communicating an authentication signal to an interface device having persistent authentication and access to the system over a login session;

wherein the ephemeral biometric device has an ephemeral biometric identity;

the user has a user identity; and wherein the persistently communicated authentication signal comprises a nonce generated by the ephemeral biometric device, the ephemeral biometric identity, and the user identity.

6. The device of claim 5, wherein the biometric login is a fingerprint.

7. The device of claim 5, further comprising:

a fourth module for determining the location of the biometric device.

8. The device of claim 7, wherein the fourth module includes global positioning system connectivity.

9. The device of claim 7, wherein the fourth module includes indoor positioning system connectivity.

* * * * *